United States Patent Office 3,538,193
Patented Nov. 3, 1970

3,538,193
RECOVERY OF POLYMERIC MATERIALS FROM ORGANIC REACTION MIXTURES
Curtis L. Meredith, Baton Rouge, La., assignor to Copolymer Rubber & Chemical Corporation, a corporation of Louisiana
No Drawing. Filed Apr. 6, 1967, Ser. No. 628,822
Int. Cl. C08f 1/88
U.S. Cl. 260—878        15 Claims

ABSTRACT OF THE DISCLOSURE

Rubber modified plastics are recovered from viscous organic solvent reaction mixtures by addition of lower alcohols, ketones and/or organic acids in an amount insufficient to cause coagulation of the solids content, and then flashing off the solvent. The viscosity of the reaction mixture is reduced markedly, thereby allowing it to be handled easily. The recovered product has improved physical properties and is more porous.

---

This invention relates to the recovery of rubber modified plastics from viscous reaction mixtures containing organic solvent. In one of its more specific variants, the invention is concerned with an improved method of reducing the viscosity of such reaction mixtures prior to the recovery of the solids by flashing off the solvent.

A wide variety of processes have been proposed heretofore for preparing high impact or gum plastic compositions, which are referred to herein as being rubber modified plastics. The most commonly used commercial process involves a number of steps, reactions, and treating vessels including preparing a hard and durable styrene-acrylonitrile resin which is brittle and has low impact resistance, preparing in another reaction vessel a highly unsaturated elastomer such as polybutadiene which is capable of absorbing shock, thereafter improving the compatability of the elastomer with the styrene-acrylonitrile resin by grafting monomeric styrene and acrylonitrile thereon, and then blending the styrene-acrylonitrile resin with the grafted elastomer in proportions to arrive at a product which has useful physical properties. Often the prior art process failed to produce a rubber modified plastic having optimum properties in all respects, including impact resistance, tensile strength and hardness.

Recently, a unique and highly efficient solution polymerization process was discovered for the preparation of rubber modified plastics. The process allows a high impact plastic to be prepared from the rubber and resin forming monomers in one step, and also has many other desirable features which render it economically attractive. However, heretofore it was difficult to recover the rubber modified plastic product from the resultant viscous reaction mixture. The viscosity of the reaction mixture is too high for it to be handled effectively in conventional steam flashing apparatus. In instances where alcohol coagulation is used, large amounts of alcohol must be separated from the organic solvent and the organic solvent and alcohol fractions must be purified for recycle. A steam flashing process is much more attractive economically provided the viscosity of the reaction mixture could be reduced sufficiently to allow it to be handled readily. However, a suitable method for reducing the viscosity was not available prior to the present invention.

It is an object of the invention to provide a novel method of recovering rubber modified plastics from reaction mixtures containing an organic solvent.

It is a further object to provide a novel method of improving the physical properties of rubber modified plastics.

Still other objects and advantages of the invention will be apparent to those skilled in the art upon reference to the following detailed description and the examples.

In accordance with the present invention, the viscosity of a viscous reaction mixture containing a rubber modified plastic and organic solvent is reduced by addition thereto of controlled amounts of certain alcohols, ketones and acids, in an amount insufficient to coagulate the plastic content. The resulting marked reduction in the viscosity of the reaction mixture allows it to be handled readily in a subsequent flashing step for the recovery of the plastic.

Suitable alcohols contain 1–5 carbon atoms, and include methyl alcohol, ethyl alcohol, propyl alcohol, isopropyl alcohol, butyl alcohol, isobutyl alcohol and amyl alcohol. Suitable ketones contain 3–6 carbon atoms and include acetone, methyl ethyl ketone, diethyl ketone and ethyl propyl ketone. Suitable organic acids contain 1–8 and preferably 1–4 carbon atoms, and include formic acid, acetic acid, propionic acid, butanoic acid, pentanoic, hexanoic, heptanoic and octanoic acids.

The amount of the foregoing alcohols, ketones and acids to be added to the reaction mixture may vary over wide ranges, but, in all instances, substantially less is added than is required to coagulate the plastic content. Usually, about 5–200 parts by weight for each 100 parts by weight of the plastic, and preferably about 20–100 parts are sufficient. As a general rule, more of the additive is required when the reaction mixture is at room temperature or below than in instances where it is at an elevated temperature such as about 80–250° C. and preferably 100–180° C. With hot reaction mixtures, the additive may be used in an amount of about 10–50 parts by weight for preferred results. The above parts by weight are based upon each 100 parts by weight of solids in the reaction mixture.

After the viscosity of the reaction mixture has been reduced to an acceptable level, it may be passed to a prior art solvent flashing step for the recovery of the plastic. Steam flashing is preferred in most instances. Usually a stream of the reaction mixture is passed into a vessel containing hot water which is maintained at a temperature above the boiling point of the organic solvent. The reaction mixture is introduced at a point beneath the water level and steam is injected into the hot water to evaporate the solvent. The solvent and the added alcohol, acid or ketone and any unreacted monomers are evaporated and pass overhead to a recovery section where they are condensed, separated by distillation, and recycled in the process. The plastic is precipitated and forms a slurry of crumb in the vessel.

The slurry of plastic crumb may be withdrawn from the coagulating vessel on a batch or continuous basis, passed to a filter where most of the water content is removed and a filter cake is formed, and then passed to a prior art drying step. Hot air may be used for drying, such as air at a temperature of about 50–110° C. and preferably about 80–100° C. The drying step is continued until the moisture content of the polymer has been reduced to an acceptable level, which usually occurs in about 2–8 hours. Vacuum drying also may be employed to reduce the drying time substantially, such as to about 1–4 hours.

The reaction mixtures to be treated in accordance with the invention are prepared by interpolymerizing a rubbery polymer and one or more alkenyl aromatic monomers and/or one or more acrylic monomers, in an organic solvent for the rubbery polymer, and in the presence of a free radical initiator.

The organic solvent that is selected must be a solvent for the rubbery polymer. Examples of suitable solvents include aromatic hydrocarbons such as benzene, benzene substituted with one or more alkyl groups containing 1–4 carbon atoms such as toluene, dimethylbenzene, xylene and their higher homologs, naphthalene, naphthalene substituted with one or more alkyl groups containing 1–4 carbon atoms such as alpha-methyl or beta-methyl naphthalene and their higher homologs, paraffin and cyclo-paraffin hydrocarbons containing 5–15 carbon atoms, and preferably 6–10 carbon atoms, such as pentane, n-hexane, 3-methyl-pentane, 2-methyl-pentane, 2,2- and 2,4-dimethypentane, heptane, cyclopentane, cyclohexane, and alkyl substituted cyclopentanes and cyclohexanes wherein the alkyl group or groups contain 1–4 carbon atoms, including methyl cyclopentane, methyl cyclohexane and their homologs. The halogenated derivatives of the above solvents may be employed, and especially the chlorine and bromine derivatives. Chlorobenzene is very useful as a solvent.

Mixtures containing two or more of the foregoing solvents may be used, and are preferred in many instances. Examples of solvent mixtures which give unusually good results include an aromatic component such as benzene and/or toluene, and a paraffin or cycloparaffin hydrocarbon component containing six through eight carbon atoms such as n-hexane, 3-methylpentane, 2-methylpentane, n-heptane, methyl heptanes, n-octane, methyl octanes, methylcyclopentane, and/or cyclohexane. Usually better results are obtained when the above solvent mixtures contain about 40–60% by weight of the aromatic solvent component, and about 60–40% by weight of the paraffin or cycloparaffin hydrocarbon component. Best results are usually obtained when about 50% by weight of each component is present.

The alkenyl aromatic monomers which may be used in preparing the reaction mixtures include alkenyl aromatic hydrocarbons containing 8–20 carbon atoms and their halogenated derivatives. Specific examples include styrene, chlorostyrene, alpha-alkyl styrenes wherein the alkylgroup contains 1–8 carbon atoms such as alpha-methyl styrene, alpha-chloro styrene, vinyl naphthalene, alkyl substituted vinyl naphthalenes wherein the alkyl group or groups contain 1–8 carbon atoms, and halogen substituted vinyl naphthalenes. Styrene is preferred in most instances, and the invention is especially useful for the recovery of high impact polystyrene from reaction mixtures.

The acrylic monomers which may be used in preparing the reaction mixtures have the general formula

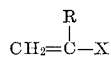

wherein R is selected from the group consisting of hydrogen and alkyl groups having 1–5 carbon atoms, and X is selected from the group consisting of

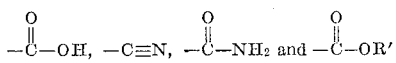

wherein R' is an alkyl group containing 1–9 carbon atoms. Examples of specific acrylic monomers which are especially useful include acrylonitrile, acrylamide, methyl or ethyl acrylonitrile, and acrylic, methacrylic, and ethacrylic acid and the methyl, ethyl, propyl and isopropyl esters thereof. Acrylonitrile is usually the preferred acrylic monomer.

When a mixture of one or more of the alkenyl aromatic monomers and one or more of the acrylic monomers is employed, preferably the ratio by weight of alkenyl aromatic monomer to acrylic monomer is at least 1.5:1, and between 2:1 and 4:1 for better results. The optimum properties are obtained in many instances with styrene and acrylonitrile at ratios by weight of 72:28 and 78:22, or about 3:1. The preferred monomers for use in preparing the monomer mixtures are usually styrene and acrylonitrile.

The rubbery polymers which may be used in preparing the reaction mixtures include those used in prior art processes for preparing high impact polystyrene or styrene-acrylonitrile plastics.

Examples of highly unsaturated or diene rubbers include those prepared by homopolymerizing the various 1,3 - butadienes, such as 1,3-butadiene, 2-methylbutadiene-1,3, piperylene, and 2,3-dimethylbutadiene-1,3. Rubbery interpolymers of the 1,3-butadienes and one or more monomers interpolymerizable therewith may be used. Examples include interpolymers prepared from monomeric mixtures containing the aforementioned 1,3-butadienes and up to 50% by weight, or more in some instances, of an ethylenically unsaturated compound which contains a $CH_2=C=$ group, wherein at least one of the disconnected valances is attached to an electroactive group which substantially increases the polar character of the molecule. Examples of compounds copolymerizable with the 1,3-butadienes are the aryl olefins such as styrene, alpha-methyl styrene and vinyl naphthalene, the alpha-methylenecarboxylic acids and their esters, nitriles and amides, such as acrylic acid, methylacrylate, methylmethacrylate, acrylonitrile, methylacrylonitrile and methylacrylamide. Specific examples of diene rubbers which are especially preferred include the styrene-butadiene rubbers containing less than 50% by weight of bound styrene, the various polybutadiene and polyisoprene synthetic rubbers including the high cis-1,4- and high trans-1,4-stereoisomers and polymers containing mixtures thereof, and the acrylontrile-butadiene rubbers. Natural rubber also may be used.

Certain synthetic elastomers characterized by a relatively low level of unsaturation are often preferred as the high impact plastic compositions prepared therefrom have markedly higher oxidation resistance and better weathering properties. Also, much less antioxidant may be used, or it may be eliminated in some instances, and this reduces the cost of manufacture and aids in keeping the non-polymer content at a minimum. Examples of rubbery polymers having a low level of unsaturation include the rubbery interpolymers of ethylene and at least one alpha monoolefin containing 3–16 carbon atoms, rubbery interpolymers of ethylene and at least one polyene, rubbery interpolymers of ethylene, at least one alpha monoolefin containing 3–16 carbon atoms and at least one polyene, and rubbery interpolymers of isobutene and at least one polyene. Specific examples of rubbers having low unsaturation include ethylene-propylene rubbery copolymers, ethylene-propylene-diene rubbery interpolymers, and butyl rubber. Commercial butyl rubber is usually a copolymer of isobutene and approximately 1–5% by weight, and preferably about 2% by weight, of isoprene. With the exception of butyl rubber, the preferred polyene in the above rubbery polymers is usually a nonconjugated diene.

The preparation and properties of the foregoing rubbers are well known and are described in a large number of issued United States patents and other publications, including the following: Introduction to Rubbery Technology, edited by M. Morton, Reinhold Publishing Corporation, New York (1959); Synthetic Rubber Technology, vol. 1, by W. S. Penn, Maclaren and Sons, Ltd., London (1960); Rubber, Fundamentals of Its Science and Technology, J. Le Bras, Chemical Publishing Company, Inc., New York (1957); and Linear and Stereoregular Addition Polymers, N. G. Gaylord et al., Interscience Publishers, New York (1959). Typical commercially available elastomers of the foregoing types are described in the text "Compounding Ingredients for Rubbers," 3rd edition, Cuneo Press of New England, Cambridge, Mass. The above publications are incorporated herein by reference.

The preferred elastomers having low unsaturation are products resulting from interpolymerizing a monomeric mixture containing 10–90 mole percent of ethylene, 10–90 mole percent of at least one other straight chain alpha monoolefin containing 3–16 carbon atoms which preferably is propylene, and 0.1–10 mole percent of a polyunsaturated bridged-ring hydrocarbon having at least one carbon-to-carbon double bond in a bridged ring, in solution in hexane or other organic polymerization solvent, and in the presence of a catalyst prepared from vanadium oxytrichloride and methyl or ethyl aluminum sesquichloride or other suitable Ziegler catalyst. Rubbery copolymers of ethylene and propylene, and rubbery terpolymers of ethylene, propylene and an open chain nonconjugated diene are also useful. The preparation of the above rubbery polymers is disclosed in United States patents such as 2,933,480, 3,093,620, 3,093,621, 3,211,709, 3,113,115 and 3,300,459, the teachings of which are incorporated herein by reference.

It is preferred that the elastomers having low unsaturation be prepared from a monomeric mixture containing ethylene, propylene and the polyunsaturated bridged-ring hydrocarbon, in proportions to produce a polymer having good elastomeric properties and an unsaturation level of at least 2 carbon-to-carbon double bonds per thousand carbon atoms in the polymer. For example, the elastomer may contain chemically bound therein molar ratios of ethylene to propylene varying between about 80:20 and 20:80, and between 70:30 and 55:45 for better results. The bridged-ring hydrocarbon may be chemically bound therein in an amount to provide an unsaturation level of 2–25, and preferably about 3–16 carbon-to-carbon double bonds per thousand carbon atoms in the polymer.

Examples of the bridged ring hydrocarbons include the polyunsaturated derivatives of bicyclo(2,2,1)heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged-ring hydrocarbons include polyunsaturated derivatives of bicyclo(2,2,2)-octane as represented by bicyclo(2,2,2)octa-2, 5-diene, polyunsaturated derivatives of bicyclo(3,2,1)-octane, polyunsaturated derivatives of bicyclo(3,3,1)-nonane, and polyunsaturated derivatives of bicyclo(3,2,2)-nonane. At least one double bond is present in a bridged ring of the above compounds, and at least one other double bond is present in a bridged ring or in a side chain. Specific examples of bridged ring compounds include 5-methylene-2-norbornene, 5-ethylidene-2-norbornene, 5-isopropylidene-2-norbornene, dicyclopentadiene, the methyl butenyl norbornenes such as 5-(2-methyl-2-butenyl)-2-norbornene, or 5-(3-methyl-2-butenyl)-2-norbornene and 5-(3,5-dimethyl-4-hexenyl)-2-norbornene. The elastomers prepared from ethylene, at least one monolefin containing 3–16 carbon atoms, and the 5-alkylidene-2-norbornenes, wherein the alkylidene group contains 1–20 and preferably 1–8 carbon atoms, produce novel rubber modified plastics which have exceptional properties. The elastomer prepared from 5-ethylidene-2-norbornene is much preferred as it has outstanding properties and produces many unusual and unexpected results when used as the elastomer in the plastic compositions of the invention. As a result, this elastomer is in a class by itself.

In instances where an elastomer is employed which has no unsaturation or very little unsaturation, then it is often desirable to prepare a hydroperoxide thereof by oxidation prior to the polymerization step of the present invention. The oxidation may be in accordance with prior art practice, such as by heating a solution of the elastomer in the presence of molecular oxygen and an organic peroxide or hydroperoxide as an initiator. In one suitable method, the elastomer is dissolved in a mixture of benzene and hexane, and benzoyl peroxide is added as an initiator for the oxidation. The reaction vessel is pressurized to 50 p.s.i. with oxygen and maintained at 60–70° C. for 0.5 to 8 hours. Oxidation can also be effected without a free radical initiator by reacting for 2–10 hours. Resin forming monomers are added to the solution of the oxidized elastomer, with or without adding additional free radical initiator, and polymerized to form a rubber modified plastic. The hydroperoxide groups formed during the oxidation step may alone act as the initiator for the monomer polymerization. It is understood that the elastomer may be oxidized to form hydroperoxide groups thereon whenever there is difficulty in reacting the elastomer substrate with the graft monomer or monomers in the desired amounts to thereby achieve greater ease of grafting.

A wide variety of free radical polymerization initiators may be employed, including those used in the prior art processes for preparing high impact polystyrene and styrene-acrylonitrile plastics. In some instances the hydroperoxide groups formed by oxidation of the rubbery component may act as the free radical initiator. Examples of free radical polymerization initiators include the organic peroxides such as benzoyl peroxide, lauroyl peroxide, propionyl peroxide, 2,4-dichlorobenzoyl peroxide, acetyl peroxide, tertiary butyl hydroperoxide, tertiary butyl perbenzoate, tertiary butyl peroxyisobutyrate, and dicumylperoxide. Mixtures of one or more peroxides may be employed. Additionally, mixtures of one or more peroxides with azo-bisdiisobutyronitrile give better results in some instances and especially where a less active initiator is effective. For example, when using the highly unsaturated diene rubbers, or rubbers of low or high unsaturation that have been subjected to an oxidation step to form hydroperoxide groups thereon, then a less active free radical initiator should be used for optimum results. The initiator mixture may contain 25–75% and preferably about 50% by weight of the azo-bisdiisobutyronitrile, and 75–25%, and preferably about 50% by weight, of one or more of the above organic peroxides. In instances where an unoxidized elastomer is used having a low degree of unsaturation, then it is desirable to employ a highly active free radical initiator, e.g., a prior art initiator which is known to abstract hydrogen from the elastomer and rapidly initiate the graft reaction. Many examples of such highly active free radical initiators are known, such as benzoyl peroxide.

The amount of the alkenyl aromatic monomer and/or the acrylic monomer that is grafted on the elastomer during the polymerization step should be sufficient to render it compatible with the resin that is formed simultaneously. For example, the resin-forming monomer or monomers may be grafted on the elastomer in an amount to provide a ratio by weight of the grafted monomeric material to the elastomer between 1:4 and 4:1, and preferably between 1:4 and 2:1. The best results are usually obtained when about 30–120 parts by weight of the resin-forming monomer or monomers are grafted on each 100 parts by weight of the rubbery polymer.

The reaction mixture to be polymerized should contain about 1–50 parts by weight, and preferably 4–25 parts by weight, of the rubbery polymer for each 99–50 parts by weight, and preferably 96–75 parts by weight, of the alkenyl aromatic monomer and/or the acrylic monomer. The monomeric material may be one or more alkenyl aromatic monomers or one or more acrylic monomers, or a mixture thereof in the ratios previously mentioned. The reaction mixture also should contain about 0.25–2.5 parts by weight, and preferably 0.5–1.3 to 0.75–1.1 parts by weight of the free radical catalyst or initiator for each 100 parts by weight of resin-forming monomer or monomers. Additionally, much better results are achieved when the organic solvent content of the reaction mixture is varied between about 50% by weight of the total weight of the reaction mixture at the lower limit of the rubbery polymer content mentioned above, and 90% by weight thereof when the upper rubbery polymer limit is used. When the preferred rubbery polymer range mentioned above is used, i.e., 4–25% by weight, then the solvent should be present in an amount of about 85–60% by weight of the total reaction mixture.

The temperature of the polymerization may vary over wide ranges. For instance, reaction temperatures of approximately 40–150° C., and preferably about 60–80° C. are usually satisfactory. The polymerization is continued for a sufficient period of time to assure a desired percent conversion of the monomer or monomers. This will vary somewhat with the specific initiator, solvent, rubbery polymer, monomers, and reaction temperature that are employed. However, reaction times of about 8–24 hours are usually satisfactory. In any event, preferably the reaction is continued until at least 60% by weight of the monomeric material initially present has been converted to polymer, and for best results 95–100% by weight.

The reaction mixture also may contain a crosslinking agent, i.e., a compound containing at least two reactive sites such as two or more ethylenic double bonds. Examples of crosslinking agents are divinylbenzene, the divinyl ether of ethylene glycol, triallylcyanurate, and 1,3-butylene-dimethacrylate. The crosslinking agent may be added in an amount of, for example, 0.005–1.0 part by weight, and preferably about 0.01–0.5 part by weight, per 100 parts by weight of the monomeric material to be polymerized. Still other types of crosslinking agents may be employed as it is only necessary that it have two or more reactive sites under the conditions of the polymerization.

The reaction mixture may be agitated during the polymerization but vigorous agitation is not necessary. As the polymerization proceeds, the resinous polymer that is formed generally precipitates in a finely dispersed form and remains suspended in the reaction mixture. The rubbery polymer generally remains dissolved in the solution after it has been grafted with the resin-forming monomers. Thus, the polymerization may produce simultaneously one or more resinous homopolymers of the monomer or monomers present, a resinous interpolymer when two or more resin-forming monomers are present, and the rubbery polymer grafted with one or more of the resin-forming monomer or monomers. As a result, at the end of the polymerization the reaction mixture contains all of the components that are needed for a high impact plastic composition, and it is only necessary to recover the products of the polymerization therefrom.

Prior art antioxidants, processing aids and other compounding ingredients and aids may be added at any convenient point in the process. Inasmuch as these ingredients are soluble in the organic solvent, they may be added to the polymerization mixture prior to recovery of the product. Examples of suitable antioxidants include phosphited polyalkyl polyphenols and tri (mixed mononyl-dinonyl) phenyl phosphite. Examples of processing aids are mineral oils and the salts and esters of higher fatty acids. When desired, coloring agents may be added to produce colored resins. The coloring pigments of the prior art are suitable for this purpose.

Surprisingly, the method of the present invention improves the physical properties of the plastic. For instance, the tensile strength and Izod impact resistance are higher when the plastic is recovered in accordance with the present invention than when it was recovered by coagulation or by an ineffective steam stripping step. The plastic product is also more porous, uniform and faster drying than products obtained by coagulation with alcohol or by prior art steam flashing processes.

The foregoing detailed description and the following specific examples are for purposes of illustration only, and are not intended as being limiting to the spirit or scope of the appended claims.

EXAMPLE I

This example illustrates the recovery of rubber modified plastics from reaction mixtures in accordance with the present invention.

The rubbery polymer used in this example was a terpolymer of ethylene, propylene and 5-ethylidene-2-norbornene which contained chemically bound therein approximately equal weights of ethylene and propylene, and sufficient 5-ethylidene-2-norbornene to provide an unsaturation level of 12.9 carbon-to-carbon double bonds per 1000 carbon atoms. The Mooney viscosity was 66 (ML–4).

The high impact plastic to be recovered was prepared using a polymerization solvent containing 170 g. of benzene and 170 g. of hexane. The terpolymer in an amount of 15 g. was dissolved in the solvent, and 97.5 g of styrene and 32.5 g. of acrylonitrile was added. Then, 1.3 g. of benzoyl peroxide was added and the temperature of the reaction mixture was raised to 70° C. to initiate the reaction. The reaction was allowed to continue with agitation for 20 hours at 70° C., which resulted in substantially complete conversion of the monomers.

The solids content of the reaction mixture was recovered by steam flashing in a vessel containing hot water maintained at 100° C. Steam was fed to the vessel continuously and the reaction mixture was introduced beneath the liquid surface. The solvent was evaporated and removed overhead as a vapor, thereby forming a slurry of the product in the vessel. The slurry was dewatered and the product was dried.

In two different runs, methanol was added to the reaction mixture in amounts, on a weight basis, of 34 and 67 parts for each 100 parts of solids, and admixed therein prior to the recovery step. There was a marked decrease in the initial viscosity of the reaction mixture. For instance, the initial reaction mixture was so viscous that it could not be passed effectively into the vessel and stripped free of solvent. It was therefore impossible to recover the plastic by steam flashing using conventional equipment.

Upon admixing the 34 parts of methanol into the reaction mixture, the viscosity dropped to 4000 centipoises. Upon addition of the 67 parts of methanol, the viscosity dropped to only 680 centipoises. Thus, the reaction mixture could be easily handled and the plastic recovered after addition of methanol.

It is apparent from the foregoing data and observations that the process of the invention is highly effective in reducing the viscosity of the reaction mixture, thereby allowing the solids content to be readily recovered by steam flashing.

EXAMPLE II

A high impact plastic was prepared following the general polymerization procedure of Example I. However, the recipe was changed to 170 g. of benzene, 170 g. of hexane, 84.0 g. of styrene, 28.0 g. of acrylonitrile, 12.5 g. of the terpolymer, and 1.12 g. of benzoyl peroxide. Also, the terpolymer contained chemically bound 5-ethylidene-2-norbornene in an amount to provide a carbon-to-carbon double bond content of 9.8, and the Mooney viscosity was 94 (ML–4).

The plastic was recovered from one portion of the reaction mixture by coagulation with isopropyl alcohol, and from a second portion by steam flashing.

In recovering the portion of the plastic by isopropyl alcohol coagulation, the alcohol was added in an amount of 900 parts by weight per 100 parts of solids in the reaction mixture, which is in excess of that quantity required for coagulation. The precipitated product was filtered, washed and dried at 60° C. for 18 hours. The plastic was tested to determine the impact resistance in accordance with ASTM D–256–56, Method A. The Izod impact resistance was 2.2 ft. lb. in. of notch.

The solids content of a second portion of the reaction mixture was recovered by steam flashing. Prior to passing the reaction mixture to the coagulation vessel, methanol was added in the quantities noted in Table I. The viscosity prior to addition of the alcohol was such as to render it difficult to recover the solids content initially by steam flashing. However, upon addition of the alcohol, the viscosity was reduced markedly to the values noted in the table.

The product in the form of crumb was filtered from the hot aqueous water suspension withdrawn from the coagulating vessel, and then dried in an oven at 60° C. for 18 hours. The plastic product was tested to determine the Izod impact resistance value following the same procedure as noted above. The Izod impact values thus obtained appear in the table below.

TABLE I

| Amount of methanol added, percent by wt. | Viscosity of the reaction mixture after methanol addition, centipoises | Izod impact value |
| --- | --- | --- |
| 15 | 2,550 | 3.24 |
| 37 | 2,375 | 2.55 |
| 74 | 825 | 2.64 |
| 111 | 525 | 2.38 |

Upon examining the above data, it may be noted that the addition of relatively small quantities of methanol, and far less than the quantity required for coagulation of the plastic, resulted in a marked reduction in the viscosity of the reaction mixture. Additionally, the Izod impact value was increased very substantially over the value obtained for the product which was recovered by coagulation. For instance, the Izod impact value was only 2.22 when the plastic was recovered by isopropyl alcohol coagulation. The plastic recovered by steam flashing had Izod impact values between 3.24 and 2.38.

What is claimed is:

1. A method of recovering a rubber modified plastic from a reaction mixture including an organic solvent, the plastic being prepared by interpolymerizing in an organic solvent and in the presence of a free radical initiator about 1–50 parts by weight of a rubbery polymer for each 99–50 parts by weight of monomeric material selected from the group consisting of alkenyl aromatic monomers, acrylic monomers, and mixtures thereof, the organic solvent being a solvent for the rubbery polymer and selected from the group consisting of (A) benzene, alkyl substituted benzenes wherein the alkyl group in each instance contains 1–4 carbon atoms, naphthalene, alkyl substituted naphthalenes wherein the alkyl group in each instance contains 1–4 carbon atoms, paraffin hydrocarbons containing 5–15 carbon atoms and cycloparaffins containing 5–15 carbon atoms, (B) halogenated derivatives of the organic solvents of Group (A), and (C) mixtures of the organic solvents of Groups (A) and (B), the alkenyl aromatic monomer being selected from the group consisting of alkenyl aromatic hydrocarbons having 8–20 carbon atoms and the halogenated derivatives thereof, and the acrylic monomer having the general formula

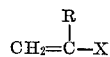

wherein R is selected from the group consisting of hydrogen and alkyl groups having 1–5 carbon atoms, and X is selected from the groups consisting of

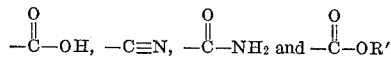

wherein R' is an alkyl group containing 1–9 carbon atoms and wherein the acrylic monomer is selected from the group consisting of acrylonitrile, acrylamide, methyl or ethyl acrylonitrile and acrylic, methacrylic and ethacrylic acid and the methyl, ethyl, propyl and isopropyl esters thereof comprising admixing into the resulting viscous reaction mixture at least one compound selected from the group consisting of alcohols containing 1–5 carbon atoms, ketones containing 3–6 carbon atoms, and organic acids containing 1–8 carbon atoms, the said substance being added in an amount of about 5–200 parts by weight for each 100 parts by weight of the solids in the organic solvent but in an amount insufficient to effect precipitation of the interpolymer, and then recovering the plastic by flashing off the solvent.

2. The method of claim 1 wherein the organic solvent is selected from the group consisting of benzene, toluene, mixtures of benzene with at least one hydrocarbon selected from the group consisting of paraffin and cycloparaffin hydrocarbons containing six through eight carbon atoms, and mixtures of toluene with at least one hydrocarbon selected from the group consisting of paraffin and cycloparaffin hydrocarbons containing six through eight carbon atoms.

3. The method of claim 1 wherein the solvent is flashed off by introducing the reaction mixture into hot water to which steam is supplied.

4. The method of claim 1 wherein about 10–50 parts by weight of the compound is added to the reaction mixture for each 100 parts by weight of the solids present therein.

5. The method of claim 4 wherein the said compound is selected from the group consisting of methyl alcohol, ethyl alcohol, propyl alcohol, isopropyl alcohol, acetone, formic acid and acetic acid.

6. The method of claim 1 wherein the monomeric material is styrene.

7. The method of claim 6 wherein the rubbery polymer is a terpolymer of ethylene, at least one alpha monoolefin containing 3–16 carbon atoms, and 5-alkylidene-2-norbornene.

8. The method of claim 7 wherein the 5-alkylidene-2-norbornene is 5-ethylidene-2-norbornene.

9. The method of claim 8 wherein the organic solvent is selected from the group consisting of benzene, toluene, mixtures of benzene with at least one hydrocarbon selected from the group consisting of paraffin and cycloparaffin hydrocarbons containing six through eight carbon atoms, and mixtures of toluene with at least one hydrocarbon selected from the group consisting of paraffin and cycloparaffin hydrocarbons containing six through eight carbon atoms.

10. The method of claim 9 wherein the terpolymer is present in an amount of 4–25 parts by weight for each 96–75 parts by weight of styrene, about 10–50 parts by weight of the said compound for each 100 parts by weight of the solids present in the organic solvent is added to the reaction mixture, and the solvent is flashed off by introducing the reaction mixture into hot water to which steam is supplied.

11. The method of claim 1 wherein the monomeric material is a mixture of styrene and acrylonitrile, and the ratio of styrene to acrylonitrile is between 2:1 and 4:1.

12. The method of claim 11 wherein the rubbery polymer is an interpolymer of ethylene, at least one alpha monoolefin containing 3–16 carbon atoms and 5-alkylidene-2-norbornene.

13. The method of claim 12 wherein the rubbery polymer is a terpolymer of ethylene, propylene and 5-ethylidene-2-norbornene.

14. The method of claim 13 wherein the solvent is selected from the group consisting of benzene, toluene, mixtures of benzene with at least one hydrocarbon selected from the group consisting of paraffin and cycloparaffin hydrocarbons containing six through eight carbon atoms, and mixtures of toluene with at least one hydrocarbon selected from the group consisting of paraffin and cycloparaffin hydrocarbons containing six through eight carbon atoms.

15. The method of claim 14 wherein the terpolymer is present in an amount of about 4–25 parts by weight for each 100 parts by weight of styrene and acrylonitrile, the said compound is added to the reaction mixture in an amount of about 10–50 parts by weight for each 100 parts by weight of solids in the organic solvent, and the solvent is flashed off by introducing the reaction mixture into water to which steam is supplied.

References Cited

UNITED STATES PATENTS

| | | | |
|---|---|---|---|
| 3,151,173 | 9/1964 | Wyce | 260—666 |
| 3,344,205 | 9/1967 | Grey et al. | 260—880 |
| 3,432,577 | 3/1969 | Serniuk | 260—878 |
| 3,449,471 | 6/1969 | Weitzel et al. | 260—880 |

FOREIGN PATENTS 1,009,719   11/1965   Great Britain.

MURRAY TILLMAN, Primary Examiner

M. J. TULLY, Assistant Examiner

U.S. Cl. X.R.

260—34.2, 879, 880